Nov. 11, 1969
D. M. STEARNS
3,477,581
SEWAGE DISPOSAL SYSTEM
Filed Sept. 21, 1967
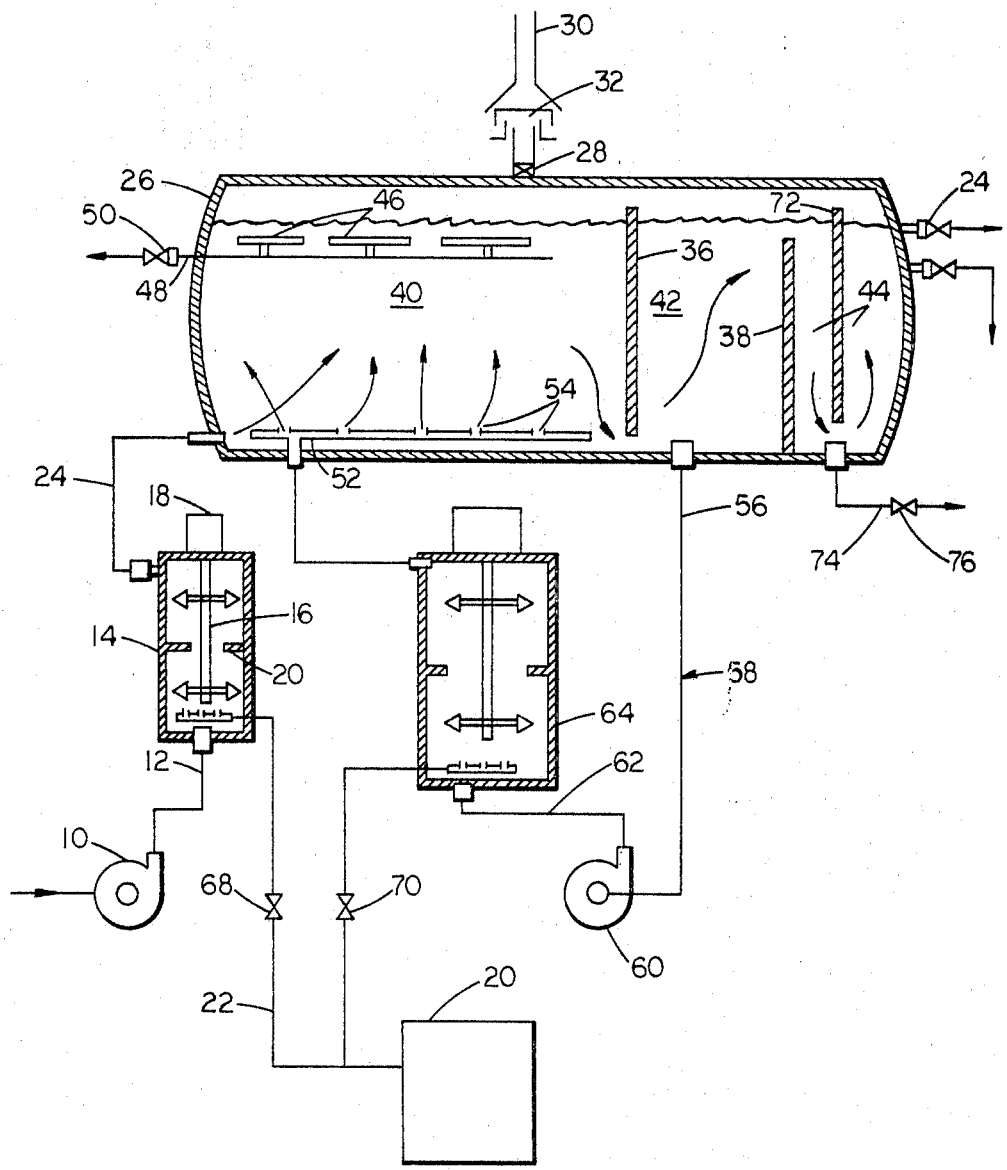
INVENTOR
Donald M. Stearns
BY Dale A. Winnie
ATTORNEY

3,477,581
SEWAGE DISPOSAL SYSTEM
Donald M. Stearns, 5581 Woodwind Drive,
Birmingham, Mich. 48010
Filed Sept. 21, 1967, Ser. No. 669,570
Int. Cl. C02c 1/26, 5/04, 5/06
U.S. Cl. 210—195   8 Claims

ABSTRACT OF THE DISCLOSURE

A system for treating sewage and organic waste materials which includes means for receiving waste water and air under pressure and breaking the waste content and air into particle sizes of less than 100 microns and dispersing it into a closed vessel having a pressure head for holding the waste particles in suspension for aerobic digestive elimination and which also includes means for floated waste separation and a recirculatory system for rejuvenating active sludge that settles out so that the residual effluent is at a tolerable level before final discharge.

Background of the invention

The treatment and disposal of sewage and organic waste materials is a growing problem in large metropolitan areas where there is a large concentration of people and heavy industry. Conventionally known settling systems are inadequate for the volume of sewage and waste that must be handled on a daily basis, land costs and the character of the treatment equipment preclude use of multiple installations, and health codes and regulations prevent dumping residues in rivers and lakes even when they are available.

Although large size solid matter may be separated from waste fluids and burned, the principal problem in sewage and waste disposal is the small size particles which cannot be separated from their liquid media by even fine filter systems and leave a contaminated effluent which must be treated before it is discharged. The residual solid concentration in the average sanitary waste is in the order of 235 p.p.m. minimum, but is extremely difficult to remove and has only been accomplished to date by settling or aerobic digestive systems which take several days to accomplish the task.

The aerobic digestive systems depend upon bacterial destruction of the waste and rely upon aeration of the waste fluid sufficient to meet the biochemical oxygen demands of the oxidizable substances for their elimination. However, presently known equipment for such systems is so inefficient that it is too expensive to install and maintain except in the most troublesome situations.

Summary of the invention

This invention relates to sewage and organic waste disposal systems for commercial and like uses and more particularly to a process of separating and eliminating oxidizable waste from the liquid media by aerobic bacterial digestive and other means used in combination.

The waste water from a conventionally known filtering system is introduced into a pressurized vessel or tank through a high speed oxidizing and dispersing unit capable of reducing the waste residue to particle sizes under 100 microns so that they are entrapped and held in suspension in the heavily aerated fluid for prolonged aerobic digestive elimination.

The oxygenator tank is pressurized to increase the oxygen absorption and retention of the waste water and is divided into three sections to provide flotation, settling and discharge zones in which particles having a low specific gravity may be collected as they rise to the top and those which are heavier and reconglomerate and settle out may be reprocessed by being recirculated through one or more oxidizing and dispersing units back into the floatation zone so that only the free effluent is left for discharge.

The recirculatory tract for the active sludge which reconglomerates and settles out is from the settling zone back into the flotation zone and is at a rate of about three times that of the initial intake. By baffles, a counter flow is established with respect to the oxidizing solids which further helps to hold them in suspension and prolongs the bacterial action.

In practice, a closed vessel under a pressure of 15 p.s.i. with a relatively simple aerating and dispersion system may be used to eliminate oxidizable waste in a matter of a few hours as compared to the several days required by the best known systems which are presently available.

A more complete description follows a brief reference to the accompanying drawing.

Description of the drawing

The single drawing figure is a diagrammatic illustration of the type of apparatus used in the practice of this invention.

Detailed description

Waste water containing oxidizable matter is received into the oxygenator apparatus used in the practice of this invention through a single stage centrifugal pump 10 capable of providing sufficient pressure to overcome flow resistance and internal pressure maintained in the system, as later described.

It passes from the pump 10 through a suitable conduit 12 into an inline type multistage air and solids dispersion mechanical mixing unit 14 which includes an impeller 16 driven by a motor 18. The dispersion unit is equipped with horizontal stage dividers 20 and may have vertical baffles (not shown) and either a disc or blade type impeller capable of tip speeds in excess of 900 feet per minute.

An air compressor 20 is used to supply compressed air through conduit 22 to the dispersion unit 14 and may be connected thereto for either counter-current or concurrent flow, as shown. The air introduced into the unit is under sufficient pressure to provide uniform flow and for the impeller to produce air bubbles or particles of 100 micron sizes or smaller for uniform distribution in the waste water passing therethrough.

The solids in the waste water are also reduced to particles of 100 micron sizes or smaller and are scrubbed and enveloped in the air particles as they pass through the dispersion unit and through the conduit line 24 into the pressurized vessel or tank 26.

The rate of flow desired and the amount of oxidizable matter present in the waste water being processed in the dispersion unit determines whether a single or multistage unit is best to achieve the required dispersion of solid and air particles in the waste water.

The pressurized vessel or tank 26 has a length which is approximately four times its diameter and receives waste water to within about six inches of its top. By means of the air introduced with the waste water, the air space is held to a pressure of about 15 p.s.i. and serves to hold the oxygen supplying air in the waste water in suspension longer than would otherwise occur and causes about a ten-fold increase in useful oxygen concentration which greatly improves the aerobic bacterial digestive process set up in the dispersion unit.

The tank or vessel 26, like the dispersion unit is designed for either single or multi-stage operation and is provided with a pressure control valve 28 located above the liquid level and which automatically maintains the pressure level desired in the tank. The air and gaseous discharge from the tank is vented through a stack 30 provided with an externally fired odor burn-off system identified generally as 32 in the drawing.

The liquid level in the tank is controlled by either a mechanical or electrical modulating valve 34 shown at the far end of the vessel at the liquid level which is to be maintained.

The oxygenator tank 26 is divided into three major sections by an under-flow baffle 36 and an over-flow baffle 38 which extend between the side walls for their designated function and with the under-flow baffle providing a floatation zone 40 within the first two-thirds of the tank and the over-flow baffle providing settling and discharge zones 42 and 44, respectively, and in that order, at the far end of the tank.

Within the floatation zone 40 there is provided one or more sludge removal pans 46 and a discharge line 48 located just below the liquid level, with an automatic valve 50 outside the tank, for collecting and removing the concentrated floated sludge which includes the low specific gravity particles which tend to rise to the top in this section. Near the bottom of this zone or section there is provided a second inlet conduit 52, open at spaced intervals along its length, as at 54, for recirculated sludge as will be described next.

In the settling zone 42, at the bottom, near the underflow baffle 36, there is provided a line 56 for removing the active sludge which has reconglomerated and settled out before it has been fully oxidized and which has flowed into the settling zone and been trapped there by the baffle wall 38.

The discharge line 56 is part of a recirculatory system 58 which includes a low head centrifugal type recirculation pump 60 connected by a conduit line 62 to a second dispersion unit 64 similar to the one previously described but larger in size and capacity. The particular size of the recirculation pump and recirculating dispersion unit are selected in accord with the flow rate desired for the amount of oxidizable waste present in the waste water under treatment but are generally such as will provide a flow rate that is three times as great as the initial or intake flow rate into the floatation zone.

The introductory flow and recirculating flow of waste water into the floatation zone through conduit line 66 create cross currents which help disperse the aerated waste water uniformly within the floatation zone and to hold the oxidizing waste particles in suspension against their tendency to group together. The baffle wall 36 also helps hold the small micron size particles and prolongs the aerobic reaction time for more full and complete elimination of the oxidizable content.

A single air compressor of suitable pressure and volume may be used to supply both dispersion units, as shown, with suitable flow control valves 68 and 70 in the feed system. It will also be appreciated that other dispersion units with like or individual air supply systems may be used in the recirculatory track, as desired.

The overflow from the settling zone 42, over baffle wall 38, is collected in the discharge zone 44 which preferably contains an underflow baffle 72 of its own to collect any additional settlings or inactive solids and to discharge them through the line 74 controlled by valve 76. A connection may be made between lines 74 and 56 to recirculate such residue, if desired, but has not been specifically shown.

Multistage oxygenator tanks will be appreciated as including a series of floatation and settling zones, each with their own recirculating systems, but having only one final discharge zone. Whether single or multi-stage in design, the tanks serve the same purpose of containing the oxidizable matter in suspension for bacterial digestion and of rejuvenating the waste water in the floatation zone again and again, or more properly, continuously, for more effective elimination of the oxidizable waste.

The retention time in the oxygenator system of this invention, before a safe level discharge, is based principally upon the BOD requirements of the organic liquids in the sewage waste rather than that of the organic solid content, as in other systems. The high oxygen level of the liquid media assures a maximum rate of bacterial action for the organic liquids while the minutely dispersed solids are held in suspension in the floatation zone and recirculated as necessary to provide the longer time required to destroy the solids.

The organic solids which are separated from the organic liquids in the floatation zone are to be understood as not floated to the top for separation in the expected sense but as held in suspension off the bottom of the tank and above the level of the underflow baffle by the recirculatory flow until their BOD requirements are essentially met and will be finally satisfied in the recirculatory and baffled flow before final discharge.

An average size oyygenator system used in the practice of this invention would include a tank 10 feet in diameter and 40 feet in length, with a capacity of 175,000 gallons per day. The floatation zone would be approximately 26.7 feet long, the settling section 9 feet and the discharge section would include the balance of 4.3 feet. For waste having a minimum 250 p.p.m. BOD requirement and a minimum concentration of solids of 235 p.p.m., the retention time in the floatation zone would be about 2½ hours total to reduce the oxidizable matter to an acceptable level for discharge.

In continuous flow operation the oxygenator system would be designed and sized to provide the necessary retention time in the one or more floatation zones to insure waste reduction to a proper level for discharge. However, in batch continuous operation suction would be taken on a digestor tank, such as those presently in use, and the discharge would be back into the opposite end of the digestor tank to provide a continuous recirculation until the desired low level of waste solids is attained.

The system disclosed may be used as primary treatment equipment or secondary equipment in existing plants and may be specifically designated for new and more efficient sewage and waste disposal plants.

What is claimed is:

1. A sewage and oxidizable waste disposal system, comprising;
   means for receiving waste water and air under pressure and for reducing the oxidizable solid waste content of the waste water and the air to particle sizes of less than 100 microns,
   a pressurized air tight vessel connected to said means for receiving the micron sized waste and air particles in suspension for floatation separation and aerobic digestive elimination therefrom,
   means for conveying the micron size waste and air particles from said receiving means to said vessel,
   a floatation zone and a settling zone in said vessel,
   means for aeration within said floatation zone,
   and outlet means for floated-off materials, clarified liquid and solid residues.

2. The waste disposal system of claim 1,
   said waste water and air receptive means including a dispersion unit including a high speed impeller having a through flow waste water connection made thereto.

3. The waste disposal system of claim 1,
   said waste water and air receptive means including a dispersion unit having a through flow connection to said vessel and a high speed impeller operative therewithin at tip speeds in excess of 900 feet per minute,
   said vessel including at least three sections provided by baffle walls therebetween with the first of said sections comprising said floatation zone and the second thereof comprising said settling zone separated from said floatation zone by an underflow baffle, an air space provided in said vessel over said floatation and settling zones and including means for maintaining at least 15 p.s.i. of pressure therein, means for separating floated sludge from said floatation zone, means for collecting and recirculating active sludge from said settling zone to said floatation zone and including a second dispersion unit for rejuvenation thereof, and a third section in said vessel including a discharge zone for receiving inactivated waste water from said settling zone for final discharge.

4. The waste disposal system of claim 1, said pressurized vessel including separate floatation and settling zones provided therein and having an underflow baffle wall therebetween, and means for removing concentrated floated sludge from the floatation zone, and for removing active settled sludge from the settling zone.

5. The waste disposal system of claim 4, said vessel also including an overflow baffle at the end of said settling zone and providing a discharge zone therebeyond for the separation of effluent having an acceptable low waste level content therefrom.

6. The waste disposal system of claim 4, including, a recirculating system including a second waste water and air receptive means connected to said settling zone for receiving the active sludge and waste water therefrom and reconveying it to said floatation zone.

7. The waste disposal system of claim 6, said recirculatory system having a flow rate at least twice as great as that between said first mentioned waste and air receptive means and the pressurized vessel.

8. The waste disposal system of claim 6, said vessel including an air space over said floatation and settling zones and means for maintaining a pressure of at least 15 p.s.i. therein.

References Cited

UNITED STATES PATENTS

| | | | |
|---|---|---|---|
| 1,124,853 | 1/1915 | Callow | 261—93 |
| 1,855,982 | 4/1932 | Mohr | 210—221 |
| 2,089,162 | 8/1937 | Goudey et al. | 210—195 X |
| 2,189,779 | 2/1940 | Daman | 261—93 X |
| 3,054,602 | 9/1962 | Proudman | 210—218 X |
| 3,092,678 | 6/1963 | Braun | 210—221 X |
| 3,260,368 | 7/1966 | Wagner et al. | 210—195 |

FOREIGN PATENTS 694,918   7/1953   Great Britain.

JAMES L. DECESARE, Primary Examiner

U.S. Cl. X.R.

210—199, 219, 220